United States Patent
Gootherts et al.

(10) Patent No.: US 7,765,550 B2
(45) Date of Patent: Jul. 27, 2010

(54) SYSTEM FOR CONTROLLING CONTEXT SWITCH OF DEFERRED REQUESTS USING COUNTER AND FLAG SETTING OF THREAD ACCESSING SHARED RESOURCE OR ENTERING CODE REGION

(75) Inventors: Paul Gootherts, Santa Clara, CA (US); Douglas Larson, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1462 days.

(21) Appl. No.: 11/139,840

(22) Filed: May 26, 2005

(65) Prior Publication Data
US 2006/0271938 A1 Nov. 30, 2006

(51) Int. Cl.
G06F 9/46 (2006.01)
G06F 12/00 (2006.01)
G06F 13/24 (2006.01)
G06F 7/38 (2006.01)

(52) U.S. Cl. ............. 718/103; 718/104; 718/108; 710/200; 710/260; 712/228

(58) Field of Classification Search ............. 718/103, 718/104, 108; 710/200, 260; 712/228
See application file for complete search history.

(56) References Cited

U.S. PATENT DOCUMENTS

| 5,515,538 A * | 5/1996 | Kleiman ............. 710/260 |
| 5,937,187 A * | 8/1999 | Kosche et al. ......... 718/104 |
| 6,061,709 A * | 5/2000 | Bronte ................ 718/103 |
| 6,061,711 A * | 5/2000 | Song et al. ........... 718/108 |
| 6,212,544 B1 * | 4/2001 | Borkenhagen et al. ... 718/103 |
| 6,728,962 B1 * | 4/2004 | Chalmer et al. ....... 718/108 |
| 7,318,222 B2 * | 1/2008 | Civlin ................ 717/151 |
| 2004/0055003 A1 * | 3/2004 | Sundaram et al. ...... 718/108 |

* cited by examiner

*Primary Examiner*—Meng-Ai An
*Assistant Examiner*—Camquy Truong

(57) ABSTRACT

In an embodiment of the invention, a method for a memory-mapped lazy preemption control, the method includes: incrementing a counter value if an operating system attempts to involuntarily context switch out a thread and fails to context switch out the thread because the thread has a flag set; checking a counter value to determine a degree of abusiveness of a thread; and based upon the degree of abusiveness, determining if a voluntary contact switch out should be performed or should not be performed on the thread.

40 Claims, 2 Drawing Sheets

SYSTEM FOR CONTROLLING CONTEXT SWITCH OF DEFERRED REQUESTS USING COUNTER AND FLAG SETTING OF THREAD ACCESSING SHARED RESOURCE OR ENTERING CODE REGION

TECHNICAL FIELD

Embodiments of the present invention relate generally to computer systems, and more particularly to an apparatus and method for memory mapped lazy preemption control.

BACKGROUND

Modern computer operating systems multitask by running each thread (the part or parts of an application that actually run) for a little while (often much less than approximately one second), then switching to another thread for a little while. The overall appearance to a human using the computer is the illusion that all (or many) of the threads are running at the same time.

Each processor's attention can switch from one thread to the next thread for one of two reasons. The reasons are due to a "voluntary" context switch out or an "involuntary" context switch out.

A thread is voluntarily switched out by the processor if the switch out is performed as the result of a specific act committed by the thread. For example, if the thread chooses to wait for a keystroke, the thread can make no more forward progress until a key is pressed, and so the processor will switch out the thread and will switch in another thread (which then runs until that thread switches out for some reason).

An involuntary switch out of a thread is any switch that is not voluntary. An involuntary switch out can happen for a number of reasons. For example, if the thread has been running continuously for a long time, the processor may decide to switch to another thread due to fairness, or to make sure that the running thread does not completely monopolize the processor's time.

The problem with involuntary context switches is that they can easily interrupt a thread during a critical time. For example, if a particular thread happens to be performing an operation crucial to the forward progress of other threads (perhaps the particular thread is holding an important lock or other resource), then switching to another thread could severely reduce performance. Delaying the involuntary context switch until the shared resource is released would benefit all threads that need to access the shared resource. Unfortunately, the operating system has no way to know when the running thread is in one of the critical regions. A critical region is a sequence of instructions that is executed by a thread (process) in a program without interference so that the thread can atomically manipulate shared data. Since the operating system does not know if a thread is in a critical region, the operating system can sometime involuntarily switch out the thread while it is in the critical region. As a result, overall program performance is limited unnecessarily.

Therefore, there is a continuing need to improve and enhance the performance of current methods for preemption control.

SUMMARY OF EMBODIMENTS OF THE INVENTION

In an embodiment of the invention, a method for a memory-mapped lazy preemption control, the method includes: incrementing a counter value if an operating system attempts to involuntarily context switch out a thread and fails to context switch out the thread because the thread has a flag set; checking a counter value to determine a degree of abusiveness of a thread; and based upon the degree of abusiveness, determining if a voluntary contact switch out should be performed or should not be performed on the thread. In another embodiment of the invention, an apparatus is provided that performs the above method. Other features of embodiments of the invention are discussed in detail below.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
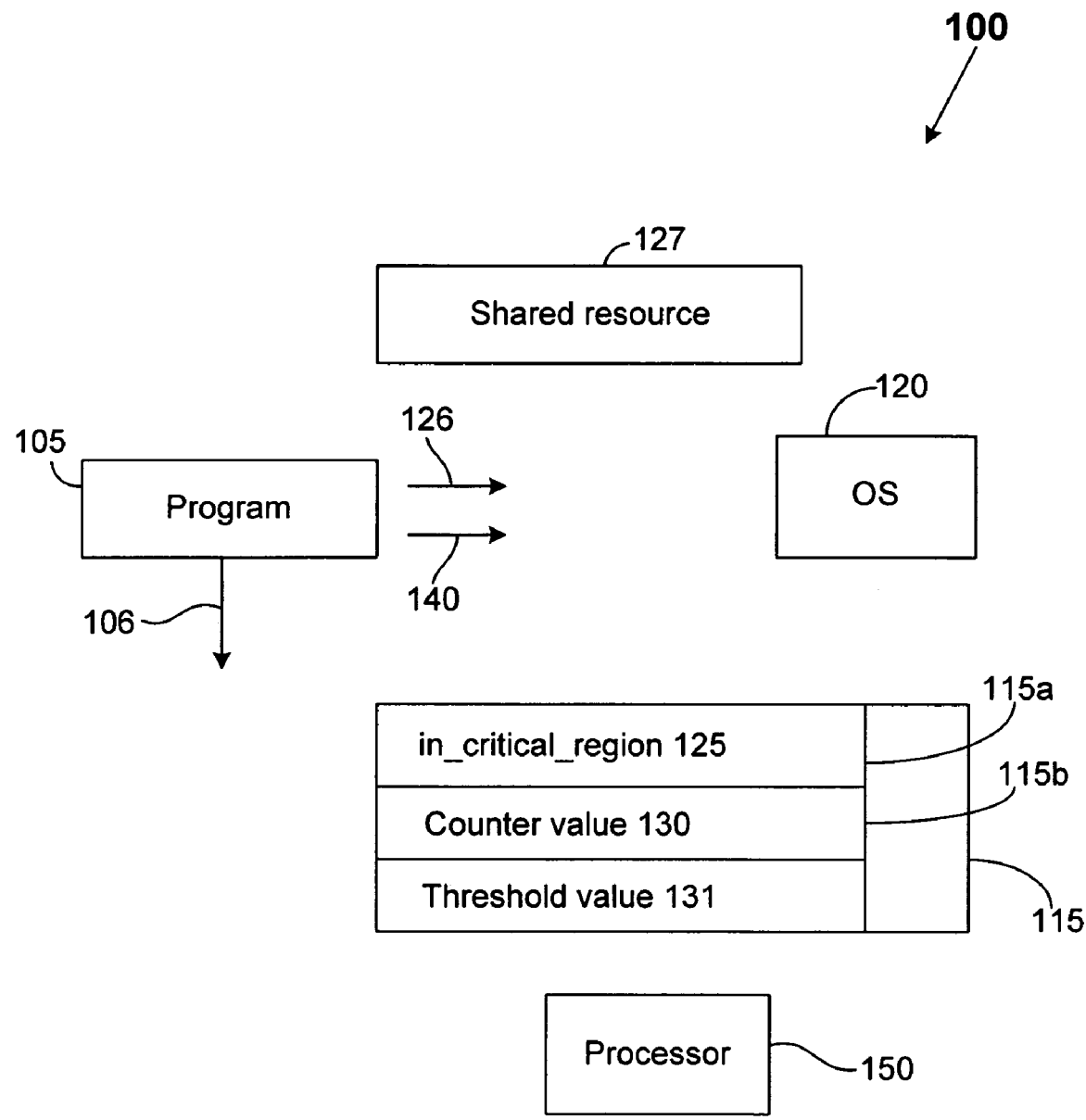
FIG. 1 is a block diagram of an apparatus (system), in accordance with an embodiment of the invention.

FIG. 1 is a block diagram of an apparatus (system) 100, in accordance with an embodiment of the invention. The system 100 provides an improved method for deferring involuntary thread preemption (context switch) by shifting the burden from the common path to a far less common path. Therefore, this method advantageously permits a "lazy" preemption control to be performed. The effect is a higher performance resulting from more effective preemption. The system 100 also provides a security mechanism to control abuse by a thread and permits the thread to get back to the good grace of the operating system so that the thread is not viewed by the operating system as abusive. The system 100 is typically in an environment of a computer or computing machine.

In the example of FIG. 1, a thread 106 in the program 105 sets aside a memory area 115*a* which is typically a small memory area in a memory 115. The memory area 115*a* is used by the program 105 in order to communicate information to the operating system 120, as described below.

The thread 106 sets and clears an "in_critical_region" flag 125 in the memory area 115*a*. This in_critical_region flag 125 permits the thread 106 to inform the operating system 120 when it would be "inconvenient" to involuntarily context switch out the thread 106 because the thread 106 is in a critical region of code or has a shared resource 127. As an example, if thread 106 sets the in_critical_region flag 125 to a first value (e.g., value of "1"), then the thread 106 is in a critical region or has a shared resource 127, and if the thread 106 sets the in_critical_region flag 125 to a second value (e.g., clears the flag 125 value to "0"), then the thread 106 is not in a critical region or is not holding a shared resource 127. The thread 106 can set and clear the value of the in_critical_region flag 125, and the operating system 120 can read the value of the in_critical_region flag 125.

The in_critical_region flag 125 is stored in the user application's memory 115a in memory 115 (memory mapped into the application address area). Typically, the in_critical_region flag 125 may be a simple Boolean that can be changed in value by a store operation. As the thread 106 runs, the thread 106 enters and leaves critical regions. As the thread 106 enters and leaves critical regions, the thread 106 maintains a private count of the current nested depth of critical regions. Every time the thread 106 crosses over from a depth of zero to one, the thread 106 sets the in_critical_region flag 125. Whenever the thread 106 crosses from a depth of one to zero, the thread 106 clears the in_critical_region flag 125.

Once the thread 106 sets aside a memory area 115a for storing the in_critical_region flag 125, the thread 106 clears the in_critical_region flag 125 and then informs the operating system 120 of the location of this memory area 115a (typically via a system call 126 from the application program 105 to the operating system 120). Initial setup of the system 100 is now complete and an embodiment of the invention can perform the method described below.

Involuntary context switches can be a serious performance limiter if they occur when the thread that is switched out is holding a scarce (shared) resource 127 or is executing a critical region of code. The in_critical_region flag 125 in an embodiment of the invention makes it possible for threads to keep the operating system 120 informed so that the operating system 120 can make better choices on context switches.

A counter value 130 is also stored in the user application's memory 115b in memory 115 (memory mapped into the application address area). The counter value 130 is readable by the thread 106 and is writable by the operating system 120. The counter value 130 is incremented by the operating system 120 if the operating system 120 has attempted to involuntarily context switch out the thread 106 and has failed to context switch out the thread 106 because the operating system 120 has read the in critical_region flag 125 as set, which indicates that the thread 106 is in a critical region or is holding a shared resource 127. When the operating system 120 has attempted to context switch the thread but does not perform the context switch since the flag 125 is set, the operating system 120 will increment the counter value 130, but will not involuntarily context switch out the thread if the counter value 130 has not reached a threshold counter value 131. For each time that the operating system 120 attempts to involuntarily context switch out the thread 106 and fails to context switch out the thread 106 because the in_critical_region flag 125 is set, the operating system 120 will increment the counter value 130 by a value of one.

In an embodiment of the invention, when the counter value 130 is too high (i.e., near the counter threshold value 131), then the thread 106 will typically perform a voluntary context switch out. By performing the voluntary context switch out, the counter value 130 is decremented. This voluntary context switch out will redeem the thread 106 in the point of view of the operating system 120 and is behavior that is the opposite of an abusive behavior by the thread 106. By decrementing the counter value 130, the thread 106 will have additional headroom in that the chance of a future involuntary context switch out (when the in_critical_region flag 125 is set) is reduced because the counter value 130 is decremented and will be below the threshold counter value 131 that will cause the operating system 120 to perform an involuntary switch out on the thread 106. As the thread 106 performs more voluntary context switch out and permits other threads to run, the counter value 130 is decremented for each voluntary context switch out. Since the decremented counter value will avoid the counter value for that thread 106 to exceed the threshold counter value 131, when the thread 106 sets the in_critical_region flag 125, the operating system 120 will not involuntarily switch out the thread 106.

In the following example operation, assume that the threshold counter value 131 is set to 10 times per second. However, the threshold counter value 131 is set as a matter of policy or preference. For example, for real-time based systems such as robotic systems or low-latency type programs, timing is important and therefore the threshold counter value 131 is set at a relatively smaller value. As another example, for large-batch systems where programs run for longer periods or for time-share applications (e.g., email applications or browser applications), the threshold counter value 131 is usually set at relatively larger values.

Whenever the operating system 120 wants to perform an involuntary context switch out, the operating system 120 first consults the in_critical_region flag 125. This test is best performed on the processor 150 which is running the thread 106, perhaps while it is suspended for a system trap or interrupt, thus insuring there is no race condition with the critical region. As mentioned above, for each time that the operating system 120 attempts to involuntarily context switch out the thread 105 and fails to context switch out the thread 106 because the in_critical_region flag 125 is set, the operating system 120 will increment the counter value 130 by a value of one.

If the in_critical_region flag 125 is clear, the operating system 120 knows the thread 106 is not holding a scarce resource or executing a critical code region, and so the operating system 120 knows that there is no special reason not to switch out the thread 106.

If, however, the in_critical_region flag 125 is set, the operating system 120 knows the thread 106 believes it is in the midst of critical work, and so the operating system 120 chooses to defer the involuntary context switch to some later time (unless the counter value 130 has reached the threshold counter value 131). This deferral of an involuntary context switch allows the thread 106 to complete the critical operation before being switched out and throughput is kept high. There is an exception to this rule, however. If threads were allowed to delay involuntary context switches as long as they want, a thread might misuse this privilege to keep the operating system from ever switching the thread out. To prevent this abuse, the operating system 120 establishes a hard limit beyond which its charity will not be extended. This hard limit is determined by the threshold counter value 131 in an embodiment of the invention. If a thread has run beyond this limit, involuntary context switches of threads 106 will not be delayed, even if the in_critical_region flag 125 is set.

In an embodiment of the invention, when a thread 106 is about to set the in_critical_region flag 125 prior to entering a critical region, the thread 106 will read (check) the counter value 130. If the counter value 130 is near the threshold counter value, then the thread 106 can switch out voluntarily (yield the processor 150) before later setting the in_critical_region flag 125 and entering a critical region. This voluntary switch-out by the thread 106 allows some other thread to run and permits the operating system 120 to view the thread 106 as non-abusive at this point in time. When the non-abusive thread 106 is later switched in, sets the in_critical_region flag 125, and enters a critical region, the chance of an involuntary switch out for the non-abusive thread 106 is lower.

In a specific example, initially assume that the counter value 130 is at 0 and that the thread 106 has just set the in_critical_region flag 125. When the operating system 120 attempts to involuntarily context switch out the thread 106 and fails to context switch out the thread 106 because the in_critical_region flag 125 is set, the operating system 120 will increment the counter value 130 from a value of 0 to a value of 1.

When the thread 106 reads the counter value 130, it will read the value of 1 which is significantly less than the counter threshold value of 10. In accordance with an embodiment of the invention, the thread 106 will not perform a voluntary context switch out because the value of 1 is significantly less than the counter threshold value 131 of 10. When the thread 106 reads the counter value 130 of 1, the thread 106 concludes that it is not abusive in the point of view of the operating system 120.

If the thread 106 starts to behave in a manner that may be abusive in the point of view of the operating system 120, then the counter value 130 will eventually increment near or above the threshold value of 10, because the operating system 120 may have performed multiple attempts for an involuntary context switch but failed to context switch since the in_critical_region flag 125 is set during the attempts. For example, if the thread 106 has the in_critical_region flag 125 set whenever the operating system 120 attempts to involuntarily context switch out the thread 106 and fails to context switch out the thread 106 because the in_critical_region flag 125 is set, the operating system 120 will increment the counter value 130. Assume that the counter value 131 has eventually reached a value of 9. When the thread 106 reads the counter value 130, it will read the value of 9 which is near the counter threshold value of 10. In accordance with an embodiment of the invention, when the thread 106 reads the counter value 131, the thread 106 will most likely perform a voluntary context switch out because the counter value of 9 is near the counter threshold value of 10. When the thread 106 reads the counter value of 9, the thread 106 concludes that it is abusive in the point of view of the operating system 120, and can perform a voluntary context switch out. In one embodiment of the invention, the program 105 can be programmed so that the thread 106 will perform a voluntary context switch out based on, for example, standard probability computation, when the counter value 130 is near the threshold counter value. For example, if the counter value is 7, 8, or 9 (i.e., counter value 130 is near the threshold counter value of 10), then there is, for example, a 7/10, 8/10 or 9/10 probability that the thread 106 will perform a voluntary context switch out. Other known suitable methods for computations may be used in order for the thread 106 to perform a voluntary context switch out.

Therefore, an embodiment of the invention provides a security mechanism or method that prevents abuse by a thread, while at the same time helping well-intentioned threads to behave in a way that helps them and other programs using the system 100. This security mechanism controls abuse by a thread 106 and permits the thread 106 to get back to the good grace of the operating system 120, so that the thread 106 is not viewed by the operating system 120 as abusive. The counter values 130 determine the degree of goodness or abusiveness of a thread 106 in the system 100. For example, a counter value of 9 for a thread 106 is considered a higher degree of abusiveness than a counter value of 8. A counter value of 7 is considered a lower degree of abusiveness than a counter value of 8.

When the thread 106 performs a voluntary context switch out, the thread 106 will make a system call 140 (an expensive but rare operation) to the operating system 120 to request the operating system 120 to context switch out the thread 106 and to switch in another thread that will run. As a result of the switch out of the thread 106, the operating system 102 will decrement the counter value 130 (e.g., decrement the counter value 130 from a value of 9 to a value of 8). By performing the voluntary context switch out, the thread 106 is performing an action that will redeem the thread 106 in the point of view of the operating system 120, and the operating system 120 will then view the thread 106 as currently not abusive (or less abusive) because the thread 106 is willing to be switched out. After the thread 106 has been switched out, the thread 106 can then subsequently grab a lock, set the in_critical_region flag 125, and enter a critical region.

Note that when the counter value 130 is near the threshold counter value (e.g., counter value of 7, 8, or 9), the thread 106 will most like perform a voluntary context switch out, although the thread 106 does not necessarily perform the voluntary context switch out for each instance when the thread 106 reads the counter value 130 as near the counter threshold value 131. Therefore, in this example, there may be an occurrence(s) where the thread 106 will not perform a voluntary context switch out when the thread 106 reads the counter value 130 at the value of 7, 8, or 9.

When the operating system 120 has incremented the counter value 130 to at least the threshold counter value 131, then the operating system 120 performs an involuntary context switch out of the thread 106 during the switch attempt, even if the thread has the in_critical_region flag 125 set.

Note that the common operations of setting and clearing the in_critical_region flag 125 and checking the counter value 130 (all performed by a thread 106), are performed at memory access speeds, which keeps the system 100 performance high. The slower operations of incrementing and decrementing the counter value 103 and checking the in_critical_region flag 125 (all performed by the operating system 120) are performed only when an involuntary context switch is called for, which is, by comparison, a far less common operation. Again, high performance is maintained for the system 100. This preemption method is a "lazy" method because the operating system 120 informs the thread 106 (via the counter value 130) if the thread 106 should be switched out or not be switched out and the thread 106 performs the frequent operations of setting and clearing the flag 125 and reading the counter value 130. In other words, the preemption method is a lazy preemption method because the expensive operations are performed less frequently, and the cheap operations are performed more frequently. If the thread 106 is abusive, then eventually the counter value 130 will equal the threshold counter value 131 and the operating system 120 will involuntarily switch out the thread 106 during a switch attempt, whether or not the thread 106 is in a critical region. It is noted that critical regions are typically short in length in well written programs, and so an involuntary switch out of a thread that is holding a lock is typically rare in occurrence.

Figure 2:
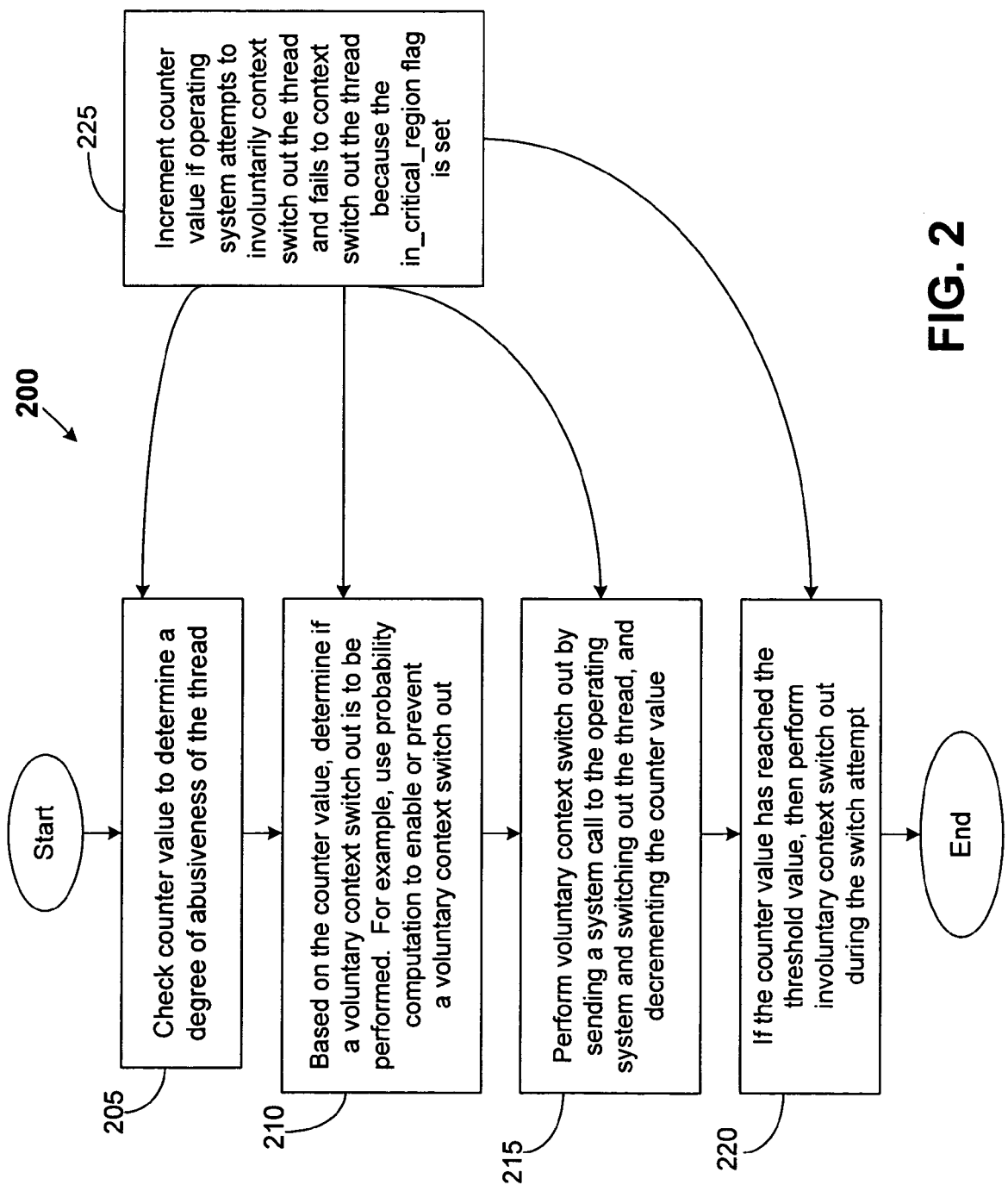
FIG. 2 is a flowchart of a method, in accordance with an embodiment of the invention.

FIG. 2 is a flowchart of a method 200, in accordance with an embodiment of the invention. In block 205, a thread 106 can check a counter value 130 to determine a degree of abusiveness of the thread 106 in the point of view of an operating system 120.

In block 210, based upon the counter value 130, the thread 106 determines if a voluntary context switch out is to be performed. For example, probability computation is used to enable or prevent a voluntary context switch out is performed based upon the counter value 130.

In block 215, perform a voluntary context switch out by sending a system call 140 to the operating system 120 and switching out the thread 106, and decrementing the counter value 130. The thread 106 can later set the in_critical_region flag 125 again, and enter a critical region or hold a shared resource, with a lesser chance of an involuntary context switch out because the counter value 130 was previously decremented during the voluntary context switch out.

In block 220, if the counter value 130 has reached the threshold counter value 131, then the operating system 120 performs an involuntary context switch out of the thread 106 during a switch out attempt by the operating system 120.

Note that in block 225, at any time after initialization of the system 100, the operating system 120 increments the counter value 130 if the operating system 120 attempts to involuntarily context switch out the thread 106 and fails to context switch out the thread 106 because the in_critical_region flag 125 is set.

The various processes or programs discussed herein may be, for example, software code, firmware, commands, data files, software programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   receiving a first operating system call from a thread, the operating system call including a location identifier for a flag, the flag being set to a first state by the thread when the thread is at least one of executing a code region or is accessing a shared resource;
   deferring a first request to context switch the thread when the flag is in the first state;
   incrementing a counter value with an operating system when the first request is deferred;
   deferring a second request to context switch the thread when the flag is in the first state;
   incrementing the counter value with the operating system when the second request is deferred;
   receiving a second operating system call from the thread when the thread detects that the counter value exceeds a threshold, the second operating system call including a request to context switch the thread; and
   context switching the thread in response to the second operating system call.

2. The method of claim 1, further comprising allocating a first memory area to the flag.

3. The method of claim 1, wherein the flag is memory mapped into an application address area.

4. The method of claim 1, wherein the counter value is memory mapped into an application address area.

5. The method of claim 1, wherein the location identifier represents an address of a memory area that stores the flag.

6. The method of claim 1, wherein the flag is set to a second state by the thread when the thread is not executing the code region and is not accessing the shared resource.

7. The method of claim 1, further comprising accessing the flag via the location identifier to determine whether to defer to the first request.

8. The method of claim 1, further comprising decrementing the counter value after context switching the thread, wherein the operating system decrements the counter value.

9. The method of claim 1, wherein the flag is writable by the thread and readable, but not writable, by the operating system.

10. The method of claim 1, wherein the counter value is writable by the operating system and readable, but not writable, by the thread.

11. A method comprising:
    sending a first operating system call from a thread to an operating system, the operating system call including a location identifier for a flag;

setting the flag within the thread to a first state when the thread is at least one of entering a code region or is accessing a shared resource;

comparing within the thread a counter value to a threshold to determine whether to context switch the thread, wherein the operating system increments the counter to represent a number of deferred requests to context switch the thread when the flag is set to the first state; and sending a second operating system call from the thread to the operating system when the thread detects that the counter value exceeds the threshold, the second operating system call including a request to context switch the thread, wherein the operating system context switches the thread in response to the second operating system call.

12. The method of claim 11, further comprising allocating a first memory area for the flag.

13. The method of claim 11, wherein the flag is memory mapped into an application address area.

14. The method of claim 11, wherein the counter value is memory mapped into an application address area.

15. The method of claim 11, further comprising setting the flag to a second state with the thread when the thread is not executing the code region and is not accessing the shared resource.

16. The method of claim 11, further comprising yielding a processor.

17. The method of claim 11, wherein the location identifier represents an address of a memory area that stores the flag.

18. The method of claim 11, further comprising continuing execution of the thread when the thread determines that the counter value is less than the threshold.

19. The method of claim 11, wherein the flag is writable by the thread and readable, but not writable, by the operating system.

20. The method of claim 11, wherein the counter value is writable by the operating system and readable, but not writable, by the thread.

21. A tangible article of manufacture storing machine-readable instructions that, when executed, cause a machine to:

send a first operating system call from a thread to an operating system, the operating system call including a location identifier for a flag;

set the flag with the thread to a first state when the thread is at least one of entering a code region or is accessing a shared resource;

compare with the thread a counter value to a threshold to determine whether to context switch the thread, wherein the operating system increments the counter to represent a number of deferred requests to context switch the thread when the flag is set to the first state; and send a second operating system call from the thread to the operating system when the thread detects that the counter value exceeds the threshold, the second operating system call including a request to context switch the thread, wherein the operating system context switches the thread in response to the second operating system call.

22. The article of manufacture of claim 21, wherein the location identifier represents an address of a memory area that stores the flag.

23. The article of manufacture of claim 21, wherein the machine-readable instructions, when executed, cause the machine to continue execution of the thread when the thread determines that the counter value is less than the threshold.

24. The article of manufacture of claim 21, wherein the flag is writable by the thread and readable, but not writable, by the operating system.

25. The article of manufacture of claim 21, wherein the counter value is writable by the operating system and readable, but not writable, by the thread.

26. The article of manufacture of claim 21, wherein the machine-readable instructions, when executed, cause the machine to allocate a first memory area for the flag.

27. The article of manufacture of claim 21, wherein the machine-readable instructions, when executed, cause the machine to memory map the flag into an application address area.

28. The article of manufacture of claim 21, wherein the machine-readable instructions, when executed, cause the machine to memory map the counter value into an application address area.

29. The article of manufacture of claim 21, wherein the machine-readable instructions, when executed, cause the machine to set the flag to a second state when the thread is not executing the code region and is not accessing the shared resource.

30. The article of manufacture of claim 21, wherein the machine-readable instructions, when executed, cause the machine to yield a processor.

31. A tangible article of manufacture storing machine-readable instructions that, when executed, cause a machine to:

receive a first operating system call from a thread, the operating system call including a location identifier for a flag, the flag being set to a first state by the thread when the thread is at least one of executing a code region or is accessing a shared resource;

defer a first request to context switch the thread when the flag is in the first state;

increment a counter value by an operating system when the first request is deferred;

defer a second request to context switch the thread when the flag is in the first state;

increment the counter value by the operating system when the second request is deferred;

receive a second operating system call from the thread when the thread detects that the counter value exceeds a threshold, the second operating system call including a request to context switch the thread; and context switch the thread in response to the second operating system call.

32. The article of manufacture of claim 31, wherein the machine-readable instructions, when executed, cause the machine to allocate a first memory area for the flag.

33. The article of manufacture of claim 31, wherein the machine-readable instructions, when executed, cause the machine to memory map the flag into an application address area.

34. The article of manufacture of claim 31, wherein the machine-readable instructions, when executed, cause the machine to memory map the counter value into an application address area.

35. The article of manufacture of claim 31, wherein the location identifier represents an address of a memory area that stores the flag.

36. The article of manufacture of claim 31, wherein the flag is set to a second state by the thread when the thread is not executing the code region and is not accessing the shared resource.

37. The article of manufacture of claim 31, wherein the machine-readable instructions, when executed, cause the machine to access the flag via the location identifier to determine whether to defer to the first request.

38. The article of manufacture of claim 31, wherein the machine-readable instructions, when executed, cause the machine to decrement the counter value after context switching the thread, wherein the operating system decrements the counter value.

39. The article of manufacture of claim 31, wherein the flag is writable by the thread and readable, but not writable, by the operating system.

40. The article of manufacture of claim 31, wherein the counter value is writable by the operating system and readable, but not writable, by the thread.

* * * * *